United States Patent
Oz et al.

(10) Patent No.: US 9,219,930 B1
(45) Date of Patent: Dec. 22, 2015

(54) METHOD AND SYSTEM FOR TIMING MEDIA STREAM MODIFICATIONS

(75) Inventors: Ran Oz, Modin (IL); S. V. Vasudevan, Fremont, CA (US); Nery Strasman, Ramat-Gan (IL); Amir Leventer, Kfar-Saba (IL)

(73) Assignee: ARRIS Enterprises, Inc., Suwanee, GA (US)

( * ) Notice: Subject to any disclaimer, the term of this patent is extended or adjusted under 35 U.S.C. 154(b) by 438 days.

(21) Appl. No.: 10/683,141

(22) Filed: Oct. 9, 2003

Related U.S. Application Data

(60) Provisional application No. 60/421,439, filed on Oct. 25, 2002.

(51) Int. Cl.
| | |
|---|---|
| H04N 7/12 | (2006.01) |
| H04N 11/02 | (2006.01) |
| H04N 11/04 | (2006.01) |
| H04N 21/234 | (2011.01) |

(52) U.S. Cl.
CPC .............................. *H04N 21/23424* (2013.01)

(58) Field of Classification Search
CPC ............................................... H04N 21/23424
USPC .................. 375/240.25; 725/34–36, 112–113
See application file for complete search history.

(56) References Cited

U.S. PATENT DOCUMENTS

| | | | | |
|---|---|---|---|---|
| 5,731,850 | A | * | 3/1998 | Maturi et al. ................. 348/699 |
| 5,805,763 | A | * | 9/1998 | Lawler et al. ................. 386/296 |
| 6,029,045 | A | * | 2/2000 | Picco et al. ..................... 725/34 |
| 6,487,721 | B1 | * | 11/2002 | Safadi ............................. 725/36 |
| 6,698,020 | B1 | * | 2/2004 | Zigmond et al. ................ 725/34 |
| 6,970,510 | B1 | * | 11/2005 | Wee et al. .................. 375/240.2 |
| 7,194,754 | B2 | * | 3/2007 | Tomsen et al. .................. 725/60 |
| 7,765,567 | B2 | * | 7/2010 | Candelore et al. .............. 725/32 |
| 2002/0087976 | A1 | * | 7/2002 | Kaplan et al. ................... 725/34 |

OTHER PUBLICATIONS

Jianhao Meng Shih-Fu Chang, "Buffer control techniques for compressed-domain video editing", May 15, 1996, IEEE, IEE International Symposium on Circuits and Systems, vol. 2, pp. 600-603.*

* cited by examiner

*Primary Examiner* — Jeremaiah C Hallenbeck-Huber
(74) *Attorney, Agent, or Firm* — Troy A. Van Aacken

(57) ABSTRACT

A system and method for triggering media stream modifications and for modifying media streams accordingly. The method includes a first step of determining, by an apparatus, an opportunity to modify a compressed media stream, by a media stream modifier, to provide a modified media stream that includes additional video content; and a second step of generating modification information representative of said determination, to be further transmitted to the media stream modifier.

46 Claims, 8 Drawing Sheets

| 182 | 184 | 186 | 188 |
|---|---|---|---|
| ID 1 | T_1 | ADDITIONAL VIDEO CONTENT #1 | PRIORITY PR1 |
| ID 2 | T_2 | | |
| | | X | X |
| | | ADDITIONAL VIDEO CONTENT #Q | PRIORITY PR0 |
| | | ADDITIONAL VIDEO CONTENT #W | PRIORITY PR8 |
| | | | |
| | | X | X |
| ID Z | T_Z | ADDITIONAL CONTENT #2 | PRIORITY PR2 |

MODIFICATION INFORMATION TABLE 180

Figure 4

METHOD AND SYSTEM FOR TIMING MEDIA STREAM MODIFICATIONS

RELATED APPLICATIONS

This application claims the priority of U.S. provisional application Ser. No. 60/421,439 filed 25 Oct. 2002.

FIELD OF THE INVENTION

The invention relates to the processing of media streams and especially compressed media streams.

BACKGROUND

Moving Pictures Expert Group (MPEG)

Methods and systems for compressing and transmitting media signals are known in the art. Compressed digital video is largely becoming the preferred medium to transmit to video viewers everywhere. Parts of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video.

An audio stream is organized as an ordered sequence of frames. A media stream is usually organized as an ordered sequence of pictures; each picture includes a plurality of pixels. A video picture includes a plurality of slices, each slice including a plurality of macro blocks. The audio and media streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. Motion estimation involves searching, for each block in the frame (usually for each macroblock) within a predefined area a best matching block. The relative positions of these blocks are referred to as motion vector. Motion compensation involves calculating the differences between each block and the best matching block and encoding said difference by a spatial transformation, such as a Discrete Cosine Transform (DCT).

There are three types of motion estimations—forward, backward and bi-directional. Macroblocks are the elementary unit for motion compensation and adaptive quantization. Each macroblock is associated with a quantization factor field, representative of the degree of quantization. A slice, including a plurality of macroblocks includes a slice header that has a quantization factor field that is associated to some of the macro blocks of the slice.

The compressed elementary streams usually include a sequence of three types of pictures. These types are known as I-picture, P-picture and B-picture. I-pictures use only intra-coding. P-pictures use forward prediction and usually also intra-coding. B-pictures use bi-directional coding (forward and/or backward prediction) and optionally also intra-coding. In a sequence of I, P, and B-pictures, each P-picture is encoded in view of a previous I-picture or P-picture. Each B-picture is coded using a previous I-picture of P-picture and/or a next I-picture or P-picture.

A recognizable picture can be reconstructed from an I-picture alone, but not from a B-picture alone. Only I-pictures and P-pictures can be anchor pictures that are used to predict another picture. I-pictures allow for reconstructing a recognizable picture but offers only relatively moderate compression. B-pictures are usually much smaller than I-pictures. Each picture includes a picture header that includes a picture type indication, indicating whether the picture is an I, B or P picture.

Pictures are sometimes arranged in groups that are referred to as Group Of Pictures (GOP). Usually, each GOP starts by an I-picture that is followed by B-pictures and P-pictures.

Elementary streams are packetized to produce PES packets. PES packets made up of elementary streams that form a program share a common time base. The PES packets may also include additional information. PES packets of distinct elementary streams can be arranged as either a Program Stream or a Transport Stream. At least one or more stream of PES packets having a common base time are usually combined to a Program Stream. A Transport Stream combines one or more programs with one or more independent time bases into a single stream. Transport Streams include transport packets of 188 bytes. Transport Stream packets start with a transport packet header. The header includes a packet ID (PID). Transport Stream packets of one PID value carry data of a single elementary stream. Transport Streams include Program Specific Information (PSI) tables. The PSI tables specify which PIDs and accordingly which elementary streams are associated to form each program.

Transport Streams may be of either fixed or variable bit rate. Some programs of the Transport Stream are of a variable bit rate, if, for example, more bits are allocated to complex scenes, and fewer bits are allocated to more simple scenes.

Transport Streams are provided to a channel of a limited available bandwidth/storage space. The ISO/IEC 13818-1 specification defines a channel as a digital medium that stores or transports a Transport or a Program Stream. The aggregate bandwidth of all the components of the Transport Stream must not exceed, at any time, the available bandwidth of the channel.

Splicing

Splicing is the act of switching from a first compressed stream to another compressed stream. Splicing is commonly used to insert advertisements.

When switching between two distinct media streams there is a need to comply with some timing and buffer capacity constraints, to allow seamless splicing. Seamless splicing means that the output stream has no visual or audio artifacts around the splice and the legality of the output stream is kept in such a manner that an external device can not detect where a splice happened from analyzing the stream alone. Various methods for seamless splicing are known in the art, some are described in U.S. Pat. No. 6,414,998 of Yoshinari et al., U.S. Pat. No. 6,434,195 of Luthra et al., U.S. Pat. No. 6,393,057 of Thoreau et al. and U.S. Pat. No. 6,393,055 of Martin. Martin suggests inserting at the splicing points, between two video sequences, an additional sequence of processed k pictures. Yoshinari suggests inserting an image material by a system and method that involve the execution of multiple compressions to meet timing and buffering requirements, especially requirements imposed by a virtual buffer verifier, at the splicing point. Thoreau describes a method in which a second data stream is modified, by replacing coding information, before the method switched from a first data stream to said modified second data stream.

Analog programs (such as NTSC or PAL) include cue tones that signal the time of an opportunity to insert advertisements.

The Society of Cable Telecommunication Engineers (SCTE) standard SCTE 35 (formerly known as SCTE DVS 253) supports splicing of MPEG-2 Transport Streams for the purpose of digital program insertion. The standard defines splicing messages (also known as cue messages) that include information about upcoming splicing opportunities in the Transport Streams. Splicing messages are sent to a server that may choose to initiate a splice according to the received messages. The standard also defines a splicing table that may include information relating to multiple splicing events.

SCTE standard SCTE 30 (formerly known as SCTE DVS 380) titled "Digital program insertion splicing application program interface" defines a method for communication between servers and splicers for the insertion of content (by splicing at splicing points) into any MPEG-2 multiplexed output of the splicer. The splicer may receive SCTE 30 messages from the server and in response switch between programs for predefined durations. The splicer may receive a multiplex of programs and output a multiplex of programs, whereas the output multiplex may differ from the input multiplex due to temporary replacements of programs (also termed primary programs) from the input multiplex by other (also termed insertion) programs.

U.S. Pat. No. 6,487,721 of Safadi describes an apparatus and method for inserting commercials into digital or analog audiovisual bit streams. Analog audiovisual signals are both analyzed to detect analog cue tones and are converted to digital audiovisual bit streams. The apparatus and system provides its own digital cue commands in response to a detection of an analog cue tone, a reception of control signals from an uplink site or a Headend. The cue commands include information for splicing audiovisual bit streams. Such a command indicates the location of a splicing opportunity in which a commercial insertion may begin or end. The commercials may be bit rate shaped off-line in order to fit the inserted commercial to bandwidth allocated for the program to which the commercial belongs. In cases where the inserted information is complementary data such as HTML pages, the audiovisual content of the original bit stream may be left intact. The cue commands are provided as a message in the transport layer such that they may be accessed without having to decode multiple layers.

Logo Insertion

Logo insertion is known in the art. Logo insertion in non-compressed media streams is quite trivial. Logo insertion of compressed streams is quite complicated, due to the dependencies between frames and within a frame resulting from intra-frame coding and inter-frame coding.

A first method for logo insertion requires completely decoding a compressed stream, performing logo insertion and then encoding the modified stream. This solution is both time and resource consuming.

Various methods for performing logo insertion without fully decoding the media stream have emerged. U.S. Pat. Nos. 6,226,041, 6,507,618 and 6,005,643 are believed to provide a description of some of said prior art logo insertion methods.

U.S. Pat. No. 6,226,041 of Florencio describes a method for logo insertion that uses disposable frames that are not used as reference for decoding other frames. Since disposable frames are never used as references for decoding other frames, the logos can be added without adversely affecting the playback of any other frames. The compressed data for disposable-frame macroblocks corresponding to the desired location for logo insertion are extracted from the compressed bitstream and replaced by intra-encoded logo-inserted data.

U.S. Pat. No. 6,005,643 of Morimoto et al. describes a method for embedding additional information into a video movie. The method involves specifying at least one embedding region in the frame of the video movie for embedding information, and determining a type of interframe prediction of the embedding region in correspondence with information to be embedded by referring to an embedding rule where a content of data to be embedded is caused to correspond to the type of interframe prediction of the embedding region. The frame in which the embedding region exists preferably is a bidirectional predictive-coded frame.

U.S. Pat. No. 6,507,618 of Wee et al. describes a compressed signal that includes independently coded regions, thus allowing logo insertion without completely decoding the whole media stream. More specifically, regions of each frame may be independently coded for later, independent extraction directly from a compressed bit stream. An encoder/transcoder receives raw video, standard compressed video or compressed video already having independently coded regions ("ICRs") that are to be edited in some manner. Only those portions of frames upon which editing or processing is to be performed are decoded. Once modified, substitute data may be inserted back into the compressed bit stream to take the place of decoded, edited data.

Ticker tape insertion is known in the art. In includes defining a window within the display for displaying information. Ticker tapes displays can be generated by well known Java programming language applets. Forex television provide a "Forex Ticker Tape" that allows an advertiser to place a real time currency ticker tape along the bottom of the screen, along with an appropriate company identification logo that is clickable. Regardless of which category the user displays, (news, analysis, etc.), the ticker remains on the screen at all times. U.S. Pat. No. 6,173,317 of Chaddha et al describes a system and method for Streaming and displaying a video stream with synchronized annotations over a computer network that includes using a ticker tape window. U.S. Pat. No. 5,860,862 of Junkin describes an interactive system allowing real time presentation of information using ticker tape format.

There is a need to provide a system for modifying media streams and for timing said modifications in an efficient manner.

SUMMARY OF THE INVENTION

The invention provides a system for triggering a modification of a compressed media stream that includes multiple media stream portions, the system includes: (i) an apparatus, coupled to the media stream modifier, for determining an opportunity to modify a media stream and to generate modification information representative of said determination; and (ii) a media stream modifier, coupled to the apparatus, for receiving the modification information and the media stream, whereas the media stream modifier is able to modify at least one portion of the media stream such as to include additional video content within said at least one portion in response to modification information.

According to an aspect of the invention the apparatus is connected to a remote entity, such as but not limited to a media broadcaster, for receiving signals and in response determining whether an opportunity occurred.

The invention provides a method for triggering a modification of a compressed media stream that includes multiple media stream portions, the method includes the steps of: determining, by an apparatus, an opportunity to modify at least one portion of the compressed media stream, by a media stream modifier, to provide a modified media stream media stream that includes additional video content; and (ii) generating modification information representative of said determination, to be further transmitted to the media stream modifier.

The method can also include a step of transmitting the modification information to the media stream modifier. The method can include additional steps of deciding whether to modify the media stream by the media stream modifier during the time frame and modifying the media stream in response to the decision.

According to various embodiments of the invention the step of modifying includes partial encoding of at least one compressed media stream portion, modifying the at least one portion of the media stream such as to comply with a decoder limitations, and/or emulating the state of a buffer of a decoder and modifying the at least one portion of the media stream in response to the emulated state.

According to various embodiments of the invention the modification includes insertion of static content, such as logo, insertion of dynamic (variable) content, whereas the content can be located at a predefined location, but this is not necessarily so.

According to yet further embodiments of the invention the modifications involves interleaving media stream frames and additional video content frames, but may include, alternatively or in additionally, modifying and/or replacing media stream frames portions. Said frame portions may be slices, macro-blocks and the like.

According to various embodiments of the invention the modification information can indicate a timing of the modification but may include, alternatively or in additionally, information relating to the additional video content, the manner in which the modification is to be implemented, and the like.

According to an embodiment of the invention at least a portion of the modification information is embedded within the compressed media stream, while according to another embodiment at least a portion is transmitted outside the compressed media stream.

According to an embodiment of the invention the modification information is responsive to splicing events. For example, the timing of the modification can be responsive to the timing of the splice events. Additionally or alternatively, the content of the additional video content may be responsive to the content of the spliced media stream.

According to yet additional embodiments of the invention the modification information can describe multiple modification events that can relate to a single media stream, to multiple media streams, to be aimed to a single media modifier and/or to be aimed to multiple media modifiers.

According to an embodiment of the invention cue tones or other means for indicating an opportunity to splice a media stream are used to indicate an opportunity to perform logo insertion or ticker tape insertion.

According to an embodiment of the invention a broadcaster can notify a local content inserter when to insert content. This notification may be done using cue tones. For example, SCTE 35 signals may be used for this.

BRIEF DESCRIPTION OF THE DRAWINGS

FIGS. 2-4 illustrate various manners for embedding at least a portion of the modification information associated with a certain program, in accordance with embodiments of the invention;

DETAILED DESCRIPTION

The following detailed examples refer to MPEG compliant transport streams and programs. Those of skill in the art will appreciate that the invention can be applied mutatis mutandis to other compressed media streams. Furthermore, as media streams are much larger than audio streams the modification of the media streams alone is discussed in detail.

In the context of this application media stream modification does not include splicing per-se. The result of the modification is not merely replacing one media stream by another, but rather providing a modified media stream that includes at least one modified media stream portion. That at least one modified portion includes at least a part of the original (pre-modification) visual content of the portion as well as additional visual content.

For example, the server, such as a server located at a Headend or a local hub (or other intermediate distribution entity connected between a Headend and an end-user) may receive information about possible modification opportunities from the Headend. As a response the server may instruct the media modifier to perform the modification, such as to initiate a logo insertion sequence or to initiate a ticker tape insertion.

Figure 1A:
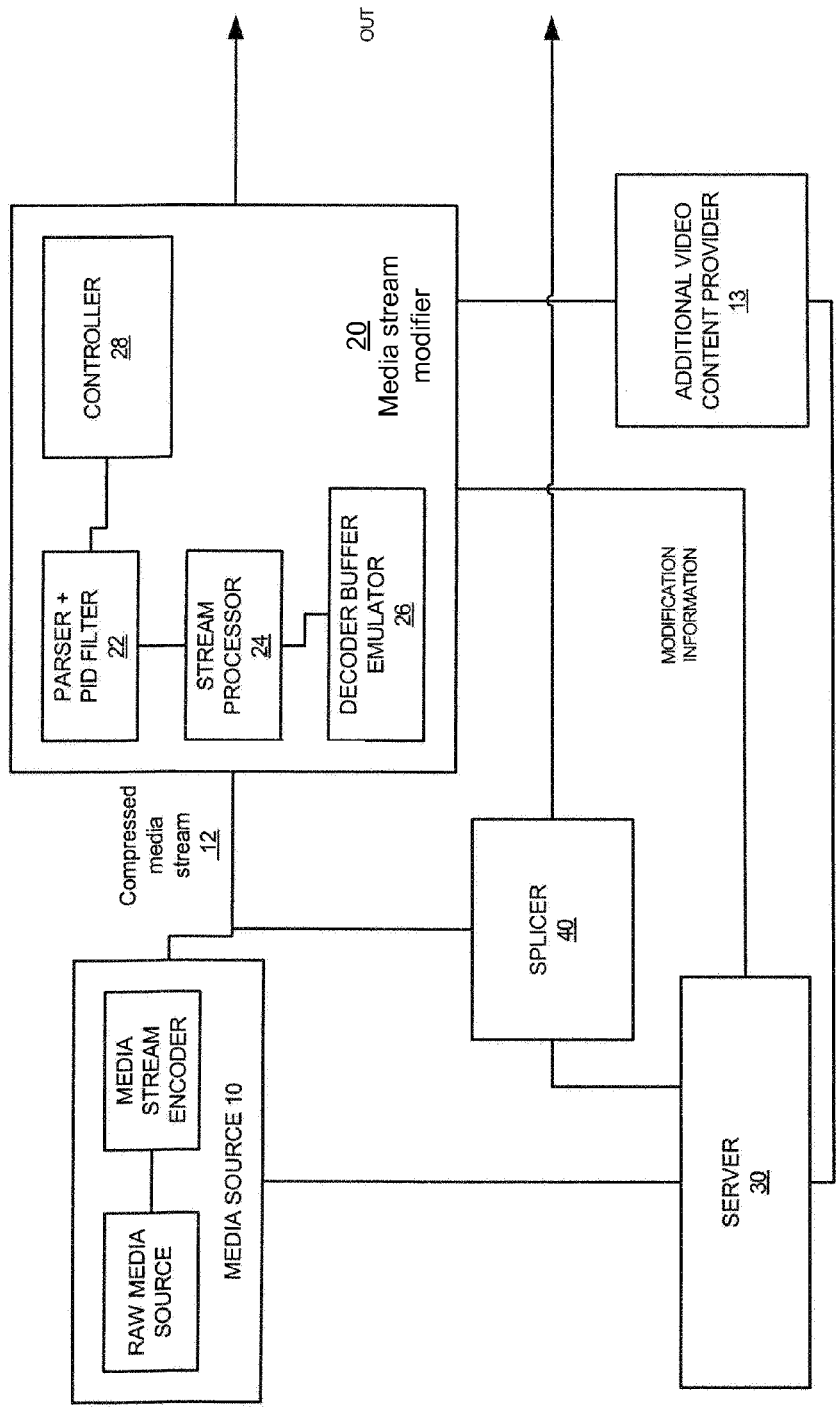
FIGS. 1A-1B illustrate systems for triggering media stream modifications and for modifying media streams, in accordance with embodiments of the invention.
Figure 1B:
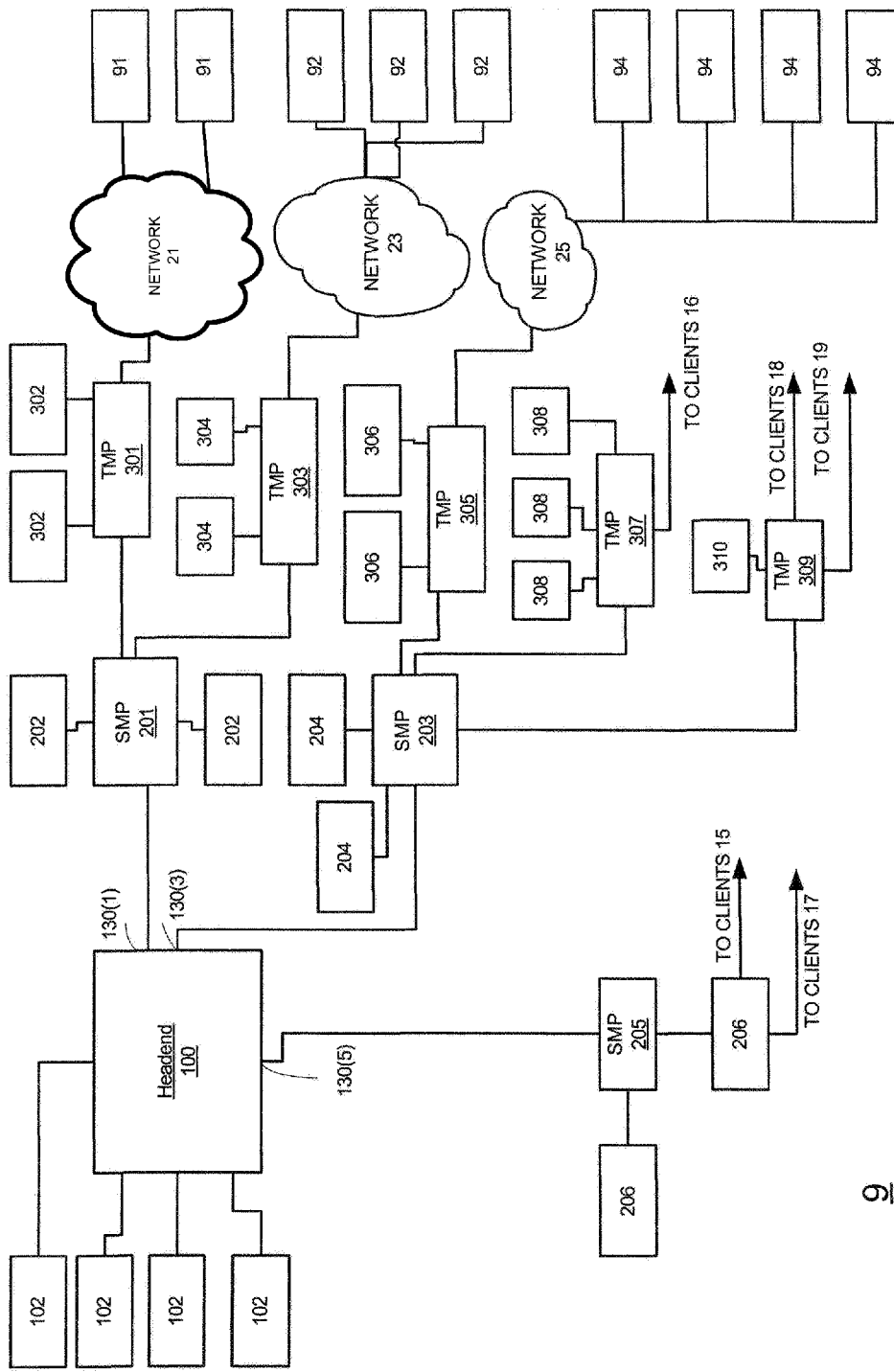

FIG. 1A illustrates a system 8 for triggering media stream modifications and for modifying media streams accordingly. FIG. 1B illustrates system 9 that includes multiple media stream modifiers.

Systems 8 and 9 are connected to multiple media sources, such as media source 10 that provides video and audio streams, such as MPEG compliant compresses media stream 12. System 8 includes a media stream modifier 20 for modifying media streams and an apparatus, such as server 30, for determining when to modify media stream 12. It is noted that the media modifier may be configured to receive a multiplex of media streams and to modify one or more media streams of said multiplex. For simplicity of explanation the reception and conversion of a single media stream is assumed.

For simplicity of explanation a single apparatus and a single media modifier are illustrated, although this is not necessarily so and multiple media modifiers can be connected to one or more apparatuses, over various links and/or networks.

Server 30 can be replaced by other apparatuses, and may include a combination of hardware, software and/or firmware that may be located in a single location or distributed among various locations. Server 30 and media stream modifier 20 may be located near each other or in remote and even remote locations, as well as being positioned at various levels of a distribution network. Said distribution network may include uplinks, headends, hubs and the like.

Server 30 and media stream modifier 20 are connected over a communication link that may include multiple channels, more than a single network, wireless and well as wire connections and the like.

According to an embodiment of the invention the server 30 and the media stream modifier 20 are connected to each other by at least one control link for exchanging control and modification information. The control and modification information may be conveyed by various communication protocols, such as but not limited to any layer of the TCP/IP protocol suit layer, DVB-ASI compliant layer and the like. The server 30 and the media stream modifier 20 may exchange signals using a handshake (or acknowledgement based) protocol but this is not necessarily so.

The additional media content to be inserted to the media stream may be provided to the media stream modifier 20 by the server 30, but this is not necessarily so, as said content may be provided to the media stream modifier 20 by yet another device (such as device 13) and/or retrieved by the media stream modifier 20 in response to the modification information. Accordingly server 30 may store multiple additional video content and it my select which additional video content to provide to media stream modifier 20 and/or which additional media content to retrieve from the other device.

Server 30 may determine when to perform a media stream modification as well as decide how to modify the media stream in response to various parameters that may include: identity of clients connected to the media stream modifier (for example this may allow local content modifications), viewing patterns of clients, timing of advertisements, content of advertisements, content of modified media stream (prior modification), and the like.

Server 30 may also receive splicing information (such as cue tones or cue commands) and may determine the modification information in response. For example, a certain logo may be inserted only during advertisements, or only not during advertisements, ticker tape insertion may be implemented only or partly during advertisements. As illustrated by FIG. 1a system 8 includes splicer 40 that is connected to media source 10 for receiving media streams and splicing them. Splicer 40 may be controlled by server 30, but this is not necessarily so. Server 30 may monitor splicing commands provided to splicer by media source 10 or may initiate splicing events by itself and transmit splicing information to splicer 40. Server 30 may select whether to receive an output media stream after being modified by media stream modifier 20 or after being spliced by splicer 40 or both devices.

Media stream modifier 20 may include parser and PID filter 22 for retrieving modification information and providing it to controller 28. Parser and PID filter 22 is also able to filter selected programs to stream processor 24 for stream modifications, whereas said modification is responsive to a status of a decoder buffer emulator 26, such as to prevent buffer overflow or underflow. Controller 28 controls the modification process and may be further coupled to stream processor 24 and emulator 26.

FIG. 1B illustrates a triple tier distribution system 9 that includes: first tier media sources 102, second tier media sources 202, 204 and 206, third tier media sources 302, 304, 306, 308 and 310; first tier multiple media stream manager and provider (FMP or Headend) 100; second tier multiple media stream managers and providers (SMPs) 201, 203 and 205; third tier multiple media stream managers and providers (TMPs) 301, 303, 305, 307 and 309; and networks 21, 23 and 25.

FMP 100 is connected to media providers 102 and SMPs 201, 203 and 205. FMP 100 may also be connected to clients and TMPs. SMP 201 is connected to output port 130(1) of FMP 100, media sources 202 and TMPs 301 and 303. SMP 203 is connected to output port 130(3) of FMP 100, media sources 204 and TMPs 305, 307 and 309. SMP 205 is connected to output port 130(5) of FMP 100, media sources 206 and clients 15 and 17. TMP 303 is connected to media sources 304, SMP 201 and network 23. TMP 305 is connected to media sources 306, SMP 203 and network 23. TMP 307 is connected to media sources 308, SMP 203 and network 25. TMP 309 is connected to media source 310, SMP 203 and clients 18 and 19.

Network 21 interconnects TMP 301 to clients 91. Network 23 interconnects TMP 303 to clients 92. Network 25 interconnects TMP 305 to clients 94. It is noted that the amount of clients that are connected to each network, as well as the amount of clients per service group well exceeds the amount of clients that is illustrated at FIG. 1. It is further noted that distribution systems may have more than three tiers, or less, as well as different entities per tier.

The first, second and third tier entities are connected to each other via networks (not shown) that are usually characterized by a bandwidth that well exceeds the bandwidth of the multiplexed signal that is eventually provided to clients. These networks may be configured in various manners, such as a mesh, star and ring configuration and can also support various communication protocols, such as Asynchronous Transfer Mode, Frame Relay, Ethernet, Gigabit Ethernet, SONET, WDM, packet switched WDM and the like. Those of skill in the art will appreciate that the distribution system may include redundant communication links and entities for increasing the robustness of the distribution system.

Each of FMP 100, SMP 201-205, TMP 301-309 may include a media stream modifier (such as media stream modifier 20) as well as an optional splicing device (not shown). Usually FMP 100 includes an apparatus, such as server 30 for generating modification information. It is noted that each higher tier entity may include apparatuses such as server 30 for generating modification information that may trigger modifications by lower tier entities. Modification information is transmitted to the multiple media modifiers over various networks and links. Each media modifier (within the multiple media stream manager and providers) is capable of modifying the media stream in a manner that differs from a modification of said media stream by another media stream modifier. Each of said media stream modifiers may receive different additional video content.

SMPs 201, 203 and 205 and TMPs 301, 303, 305, 307 and 309 can replace media streams from FMP 100 (in the case of SMPs and TMPs) or even from SMPs (in the case of TMPs) by their own media streams.

According to an embodiment of the invention each entity is assigned a special ID value, and an apparatus that is connected to these multiple media stream modifiers may generate modification information that are aimed only to specific media modifiers, by associating predefined ID values to the messages.

Figure 2:
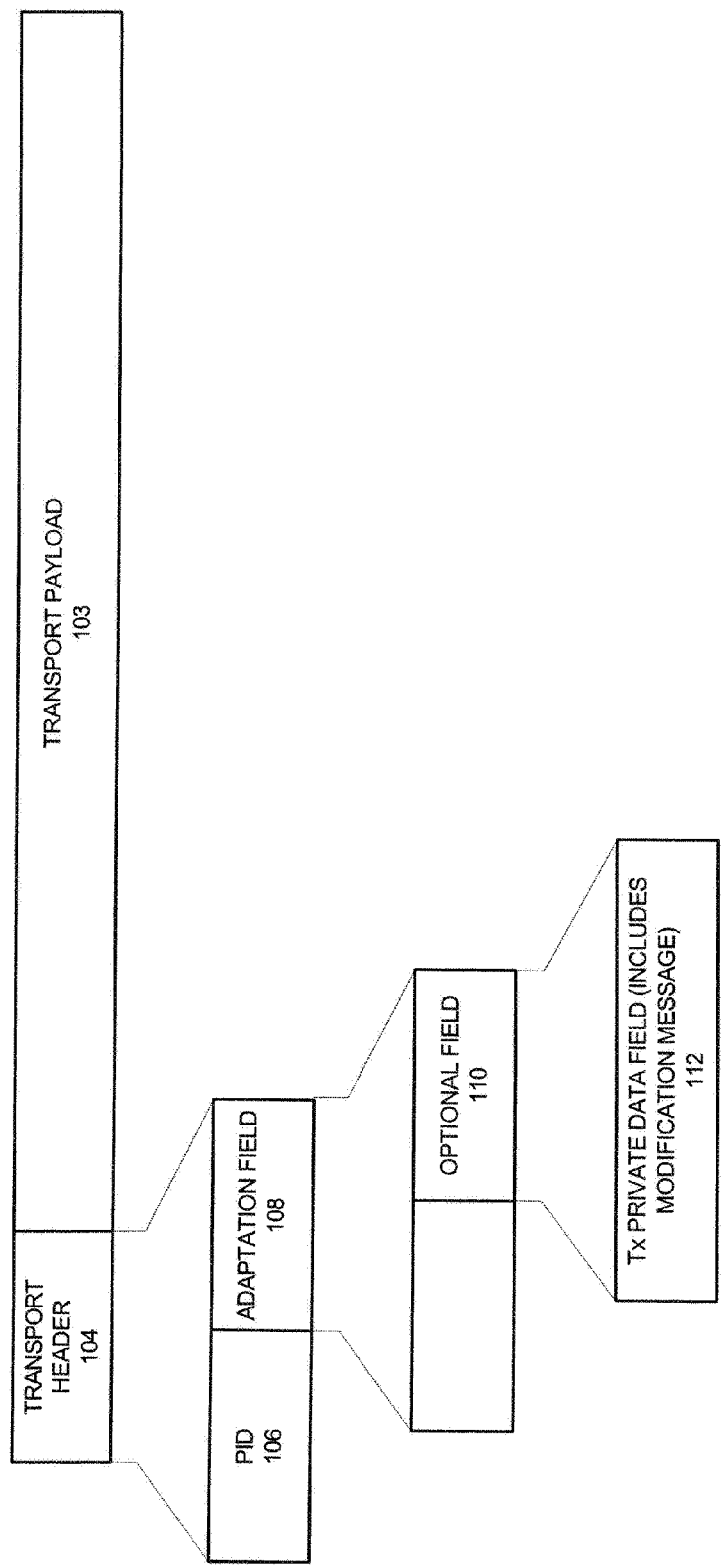
Figure 3:
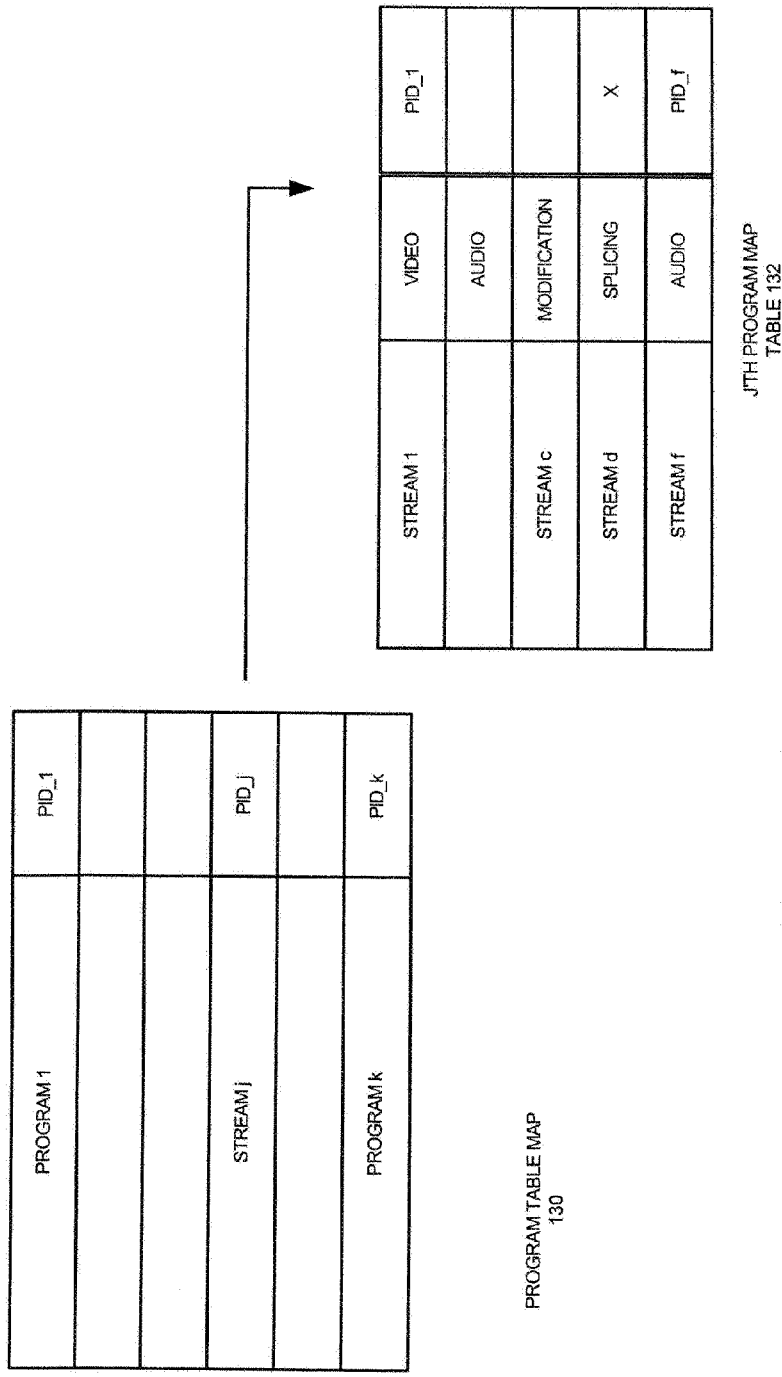

FIGS. 2-4 illustrate various manners for embedding at least a portion of the modification information associated with a certain program.

The modification information may be included within the transport stream but may also or solely be included outside the transport stream, it may be transmitted over the same link as the media stream but may also be sent over another link. Conveniently, it is embedded in a manner that allows access without fully decoding the transport stream.

FIG. 2 illustrates various fields of a transport packet 101. Said fields include transport stream payload 103, transport stream header 104 that in turn includes PID field 106 and an adaptation field 108. Adaptation field 108 includes various fields such as optional field 110 that in turn includes transport private data field 112 in which at least a part of the modification information in included.

FIG. 3 illustrates another scenario in which single modification information or even multiple modification information may be characterized by a unique PID. The modification information may be arranged in a table, but this is not necessarily so.

The unique HD of the modification information can require PID re-mapping of media streams as some media streams may be compressed and assigned a PID by entities that are not aware of the unique PID of the modification information table.

The unique PID of modification information that is associated with a certain program can be stored within a Program Map Table (PMT) that lists the PID of all streams (video elementary stream, audio elementary streams, data elementary streams) that belong to that program. The PIDs of all PMTs are listed in a Program Associated Table (PAT).

Referring to FIG. 3, PAT 130 stores a list of programs (program 1-program k) and the PID of their PMTs. A PMT 132 of the j'th program stores a list of streams the belong to the program (stream 1-stream f), their content (video, audio, data, modification information), and their PIDs. For example the PID of the modification information stream (stream d) is X. Accordingly, in order to extract modification information, the media stream modifier 20 performs PID filtering to retrieve only transport stream packets that have PID that differs from X.

FIG. 3 also describes an optional splicing information stream (stream c) that includes splice event information. According to an embodiment of the server 30, (and additionally or alternatively, the media stream modifier 30) may take into account splicing events when determining the modification information (in the case of server 30) and/or when deciding to modify the media stream accordingly (in the case of media stream modifier 20). In either case the splicing information may be retrieved by performing PID filtering.

FIG. 4 illustrates modification information table 180 that provides indications about multiple modification events.

Table 180 has multiple columns 182-188, the first column 182 includes the serial number or identification information for identifying each modification event, the second column 184 includes the timing of said event (field T 132), a third column 186 may include the location of the additional video content to be inserted (may be an address of said content within a storage unit), but may also include information reflecting the type of modification (for example, whether the additional video is static (constant imagery), dynamic insertion, consecutive frame modification, interleaving type modification, and the like), a fourth column 188 includes the priority of the modification events, such that a higher priority event can override a lower priority modification event. The fourth column or another column can also include splice related information relating whether the modification information is responsive to splicing information.

According to an embodiment some modification information are targeted to some multiple media modifiers, while other modification information are aimed to other media stream modifiers. According to said aspect the media stream modifiers are able to filter the relevant modification information by utilizing additional information such as media stream modifier code (or area code), or in response to media stream message identification information.

Figure 5:
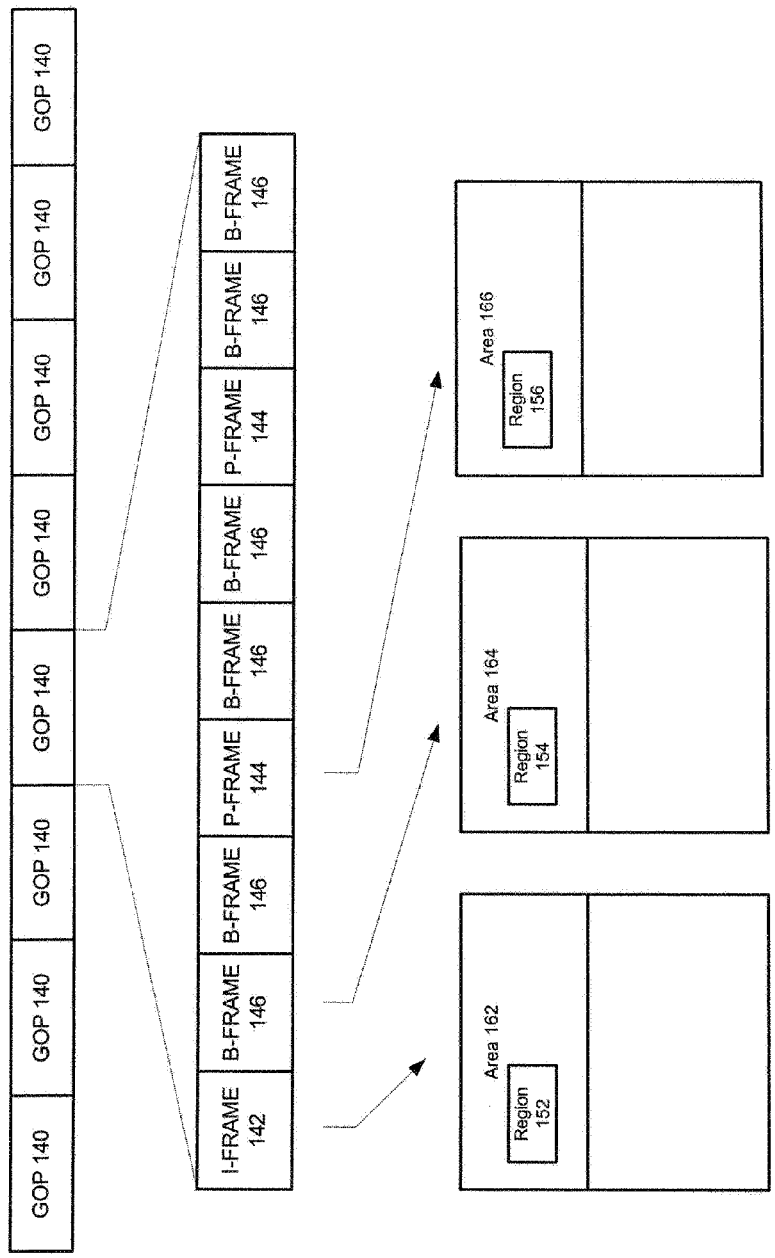
FIG. 5 illustrates a sequence of frames that are processed during additional video insertion.

FIG. 5 illustrates a sequence of frames that are processed during additional video insertion.

The frame sequence includes multiple frames that are arranged as Group Of Pictures (GOPs) 140. Each GOP 140 starts with an I-frame 142 and may further include multiple B-frames 144 and P-frames 146.

It is assumed that a logo is to be inserted in a certain region of each frame. Said certain region within an I-frame is denoted 152, within a B-frame is denoted 154 and within a P-frame is denoted 156.

Due to motion estimation and intra coding a change of certain region (152, 154 and 156) may impact macroblocks that are positioned in a larger area (162, 164 and 166 respectfully).

The size of the larger area is determined by the size of the motion vectors that may point to the certain region. Accordingly, changes within a certain region must require processing of larger areas within each frame. More specifically, the transport stream conveys information relating to the maximal size of the motion vector and said size is used to determine the size of the larger areas.

The change of a certain region also requires to process additional metadata included within the GOP. This metadata may include quantizing factor (Qscale), macroblock type, DC prediction and the like.

For example, due to the processing of a larger area within a certain frame various macroblocks may be forced to be re-quantized, in order to comply with various timing and/or bandwidth requirements. The re-quantizing is represented by a change in the Qscale of said certain frame. According to MPEG the MacroBlock header includes Qscale information only when the Qscale of a certain macroblock differs than the Qscale of the preceding macroblock. Accordingly, when a Qscale of a certain macroblock changes the Qscale of the following macroblock may be changed. Assuming that a sequence of four macroblocks was quantized by a certain quantizing factor Q1 then the first macroblocks has a Qscale field of Q1 while the others are empty. Assume that the second macroblock is re-quantized by a quantization factor of Q2 that differs from Q1. If the frame of the Qscale of the third macroblock remains empty it shall be assumed that the Qscale of both the third and fourth macroblocks is Q2. Accordingly, the Qscale of the third macroblock is changed to Q1.

It is noted that a media stream may be modified by selectively replacing splices of certain frames. Complete slices of the media stream may be replaced by new slices that include additional video content. For example, several (four or more) slices at the bottom of each frame are usually enough to convey a message. The message itself may be composed of crawling text or pictures.

The slices of each frame of the GOP may be replaced. It is noted that in P-frames and B-frames, the original slices can be replaced by slices that instruct the decoder to copy the additional slices inserted in the I-frames (using motion vectors). This leads to very small inserted slices. According to another embodiment of the invention only B-frame slices are replaced. Said replacement may cause a blinking effect as not all the pictures have the inserted data. These slice replacements can be implemented for inserting emergency messages.

Figure 6:
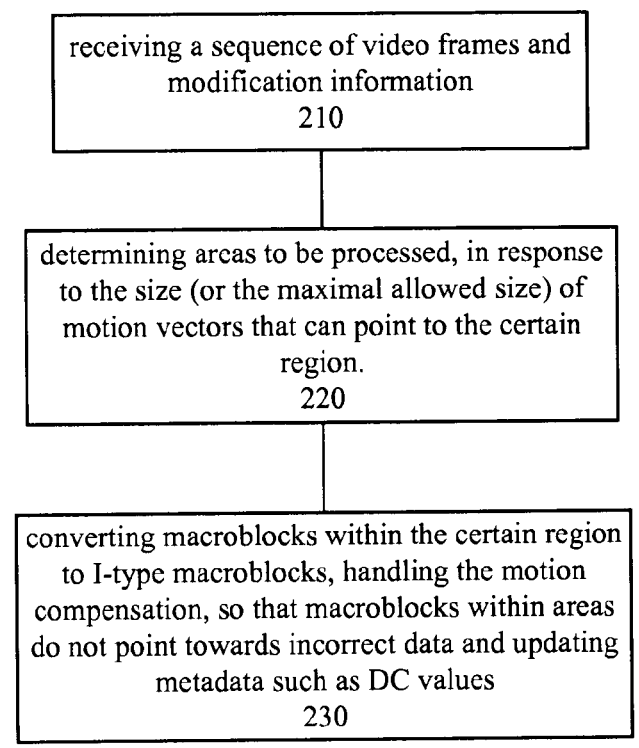
FIG. 6 illustrates a flow chart of a method for additional video insertion, in accordance with an aspect of the invention.

FIG. 6 illustrates a flow chart of method 200 for additional video insertion, in accordance with an aspect of the invention.

Method 200 starts by step 210 of receiving a sequence of video frames and modification information. Assuming that the media stream modifier determines to perform a media stream modification, step 210 is followed by step 220, else method 200 ends. Referring to FIG. 5, media stream modifier receives multiple GOPs 140 and processes the modification information to determine the certain region (such as regions 152, 154 and 156) to which the additional video shall be inserted. It is noted that the additional video can have various transparency values (said value is usually included within the modification information), such that the additional video can range between almost complete transparent till being completely opaque. This transparent value is also known as alpha (α) factor. It is noted that step 210 may include PID filtering for retrieving the sequence, metadata relating to the sequence and the modification information. On the other hand step 210 may include receiving modification information that is not embedded within the sequence, for example via another communication link. Referring to FIG. 1A, the modification information as well as the media stream may be PID filtered before being processed.

Step 210 is followed by step 220 of determining areas (such as area 162, 164 and 166) to be processed, in response to the size (or the maximal allowed size) of motion vectors that can point to the certain region. Referring to FIG. 1A this may be implemented by stream processor 24 and/or controller 28.

Step 220 is followed by step 230 of converting macroblocks within the certain region to I-type macroblocks, handling the motion compensation, so that macroblocks within areas do not point towards incorrect data and updating metadata such as DC values.

It is noted that media stream modifications may be initiated by and/or at least partially determined by the media providers in a manner that resembles splicing information or in other manners.

Figure 7:
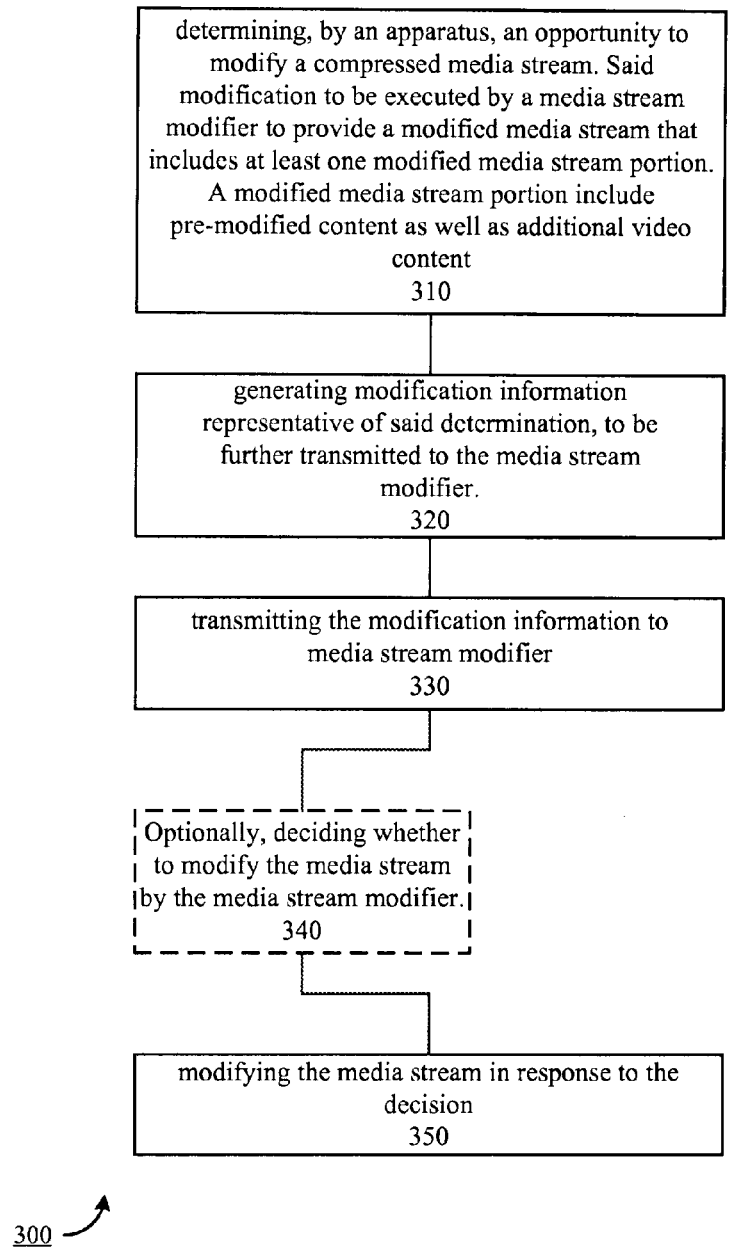
FIG. 7 is a flow chart illustrating a method for triggering a modification of a compressed media stream comprising multiple portions.

FIG. 7 is a flow chart illustrating method 300 for triggering a modification of a compressed media stream. Method 300 starts by step 310 of determining, by an apparatus, an opportunity to modify a compressed media stream. Said modification to be executed by a media stream modifier to provide a modified media stream that includes at least one modified media stream portion. A modified media stream portion includes pre-modified content as well as additional video content. Referring to FIG. 1, server 30 or even the media source 10 may determine modification opportunities, as well as the manner of modifications.

Step 310 is followed by step 320 of generating modification information representative of said determination, to be further transmitted to the media stream modifier. Referring to FIGS. 2-4 this information may be embedded in various manners, both within the media stream as well as outside the media stream.

Step 320 is followed by step 330 of transmitting the modification information to the media stream modifier. Referring to FIG. 1A the message is transmitted from server 30 to media stream modifier 20. Referring to FIG. 1b the transmission may occur between a modifier within a certain tier entity to modifiers located within the same tier or lower tiers.

Step 330 is followed by an optional step 340 of deciding whether to modify the media stream by the media stream modifier. This step is optional as according to other embodiments of the invention the modification information is mandatory.

Step 340 is followed by step 350 of modifying the media stream in response to the decision. The modification includes insertion of additional video content in at least one media stream portion. This modification may also involve removal or re-shaping or other manipulation of original media content.

According to an aspect of the invention the modification includes modifying each frame of a sequence of frames, while according to other embodiments only a portion of said frames are modified.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for triggering a modification of a compressed media stream comprising multiple media stream portions, the method comprising the steps of:

determining, by an apparatus, an opportunity to modify at least one media stream portion of the compressed media stream by a media stream modifier included within a distribution system that provides content to multiple clients over at least one network, the opportunity to modify comprising an opportunity to provide a modified media stream that includes additional video content that is independent of the compressed media stream prior to modifying the media stream, the media stream modifier being independent of the apparatus;

wherein the apparatus and the media stream modifier belong to a same tier of the distribution system;

wherein the determining comprises determining a timing of a modification of the compressed media stream based on a set of parameters comprising at least one of: an identity of the clients connected to the media stream modifier, viewing patterns of clients, timing of advertisements, content of advertisements, or content of the compressed media stream;

generating, by the apparatus, modification information representative of said determination, to be further transmitted to the media stream modifier, the modification information comprising rules for what modifications are permissible for the compressed media stream;

modifying, by the media stream modifier, at least one media stream portion of the compressed media stream to provide the modified media stream, wherein the step of modifying comprises modifying content within a subset of macroblocks included within a frame from a plurality of frames comprising a group of pictures to include the additional content without splicing the additional content into the at least one media stream portion, wherein the subset of macroblocks comprises fewer than a number of macroblocks included in the frame; and transmitting to the apparatus, by the media stream modifier, the modified media stream.

2. The method of claim 1 further comprises determining how to modify the compressed media stream based on a prior modification.

3. The method of claim 2 further comprising deciding whether or not to modify the compressed media stream by the media stream modifier; wherein the step of modifying comprises modifying, by the media stream modifier, at least one media stream portion of the compressed media stream in response to the decision.

4. The method of claim 3 wherein the step of modifying comprises a partial decoding of the compressed media stream.

5. The method of claim 3 wherein the step of modifying the media stream comprises modifying at least one media stream portion such as to comply with a decoder limitations.

6. The method of claim 5 further comprising a step of emulating the state of a buffer of a decoder and modifying at least one media stream portion in response to the emulated state.

7. The method of claim 1 wherein the step of modifying comprises modifying a region of multiple frames of the media stream portion, wherein the modifying comprises determining for each of the multiple frame an area which is larger than the region, in response to motion vectors that can point to the region, and processing only the area within each of the multiple frames.

8. The method of claim 1 wherein the step of modifying comprises interleaving media stream frames and additional video content frames.

9. The method of claim 1 wherein the step of modifying comprises selectively replacing slices of frames of the compressed media stream, to provide a media stream that comprises frames which comprise visual content of the compressed media stream, and additional visual content.

10. The method of claim 1 wherein at least a portion of the modification information is embedded within the compressed media stream.

11. The method of claim 1 wherein the at least a portion of the modification information is transmitted outside the compressed media stream.

12. The method of claim 1 wherein the modification information is responsive to splicing events.

13. The method of claim 11 wherein the media stream is not modified during splicing periods.

14. The method of claim 1 wherein the modification information is transmitted to multiple media modifiers that belong to the distribution network and differ from set top boxes.

15. The method of claim 14 wherein each media modifier is capable of modifying the media stream in a manner that differs from a modification of said media stream by another media stream modifier.

16. The method of claim 14 wherein the multiple media stream modifiers receive different additional video content.

17. The method of claim 14 wherein modification information further determines the additional video content.

18. The method of claim 1 wherein the additional video content comprises a sequence of images.

19. The method of claim 1 wherein the determination is responsive to a signal provided by a remote entity.

20. The method of claim 19 wherein the remote entity is a media broadcaster.

21. The method of claim 1, wherein the modifying comprises modifying at least one macro-block of a frame, and leaving at least one macroblock of the frame unmodified.

22. The method according to claim 1, wherein the modification information is indicative of a type of modification, wherein the type of modification comprises insertion of static additional video, insertion of a dynamic additional video, consecutive frame modification and interleaving type modification.

23. A system for triggering a modification of a compressed media stream, the system comprising:
an apparatus, coupled to the media stream modifier, for determining an opportunity to modify at least one media stream portion of the compressed media stream and to generate modification information representative of said determination, the modification information comprising rules for what modifications are permissible for the compressed media stream, and for determining timing of a modification of the compressed media stream based on a prior modification, the modification information comprising parameters comprising when to perform modification and parameters comprising at least one of: an identity of clients connected to the media stream modifier, viewing patterns of clients, timing of advertisements, content of advertisements, or content of the compressed media stream; and
a media stream modifier of a distribution system that provides content to multiple clients over at least one network, coupled to the apparatus, for receiving the modification information and the compressed media stream, whereas the media stream modifier is able to modify the compressed media stream such as to include additional video content, in response to modification information, wherein the media stream modifier is adapted to modify portions of media stream frames by modifying a subset of macroblocks included within a frame from the media stream frames to provide a modified media stream without splicing content into the media stream, wherein the media stream modifier is adapted to transmit to the apparatus the modified media stream, the subset of macroblocks being less than a number of macroblocks included in the frame;
wherein the apparatus differs from the media stream modifier;
wherein the apparatus and the media stream modifier belong to a same tier of the distribution system.

24. The system of claim 23 wherein the apparatus is further capable of determining how to modify the compressed media stream based on a prior modification transmitting the modification information to the media stream modifier.

25. The system of claim 23 wherein the media modifier is adapted to decide whether or not to modify the compressed media stream in response to the modification information and to modify the compressed media stream in response to the decision.

26. The system of claim 23 wherein the media modifier is adapted to partially decode the compressed media stream.

27. The system of claim 23 wherein the media modifier is adapted to modify the media stream such as to comply with decoder limitations.

28. The system of claim 27 wherein the media stream modifier is further capable of emulating the state of a buffer of a decoder and modify the media stream in response to the emulated state.

29. The system of claim 23 wherein the media modifier is adapted to modify a region of multiple frames of the media stream portion, by processing within each of the multiple frames an area which is larger than the region and which is determined for each of the multiple frames in response to motion vectors that can point to the region.

30. The system of claim 23 wherein the media modifier is adapted to interleave media stream frames and additional video content frames.

31. The system of claim 23 wherein the media modifier is adapted to selectively replace splices of frames of the compressed media stream, to provide a media stream that comprises frames which comprise visual content of the compressed media stream, and additional visual content.

32. The system of claim 23 wherein the apparatus is adapted to embed at least a portion of the modification information within the compressed media stream.

33. The system of claim 23 wherein the apparatus is adapted to transmit at least a portion of the modification information outside the compressed media stream.

34. The system of claim 33 wherein the apparatus is adapted to determine modification information in response to splicing events.

35. The system of claim 34 wherein the apparatus is adapted to determine a time frame during which the media stream can be modified.

36. The system of claim 23 wherein the apparatus is coupled to multiple media modifiers.

37. The system of claim 36 wherein the modification information is transmitted to the multiple media modifiers.

38. The system of claim 37 wherein each media modifier is capable of modifying the media stream in a manner that differs from a modification of said media stream by another media stream modifier.

39. The system of claim 37 wherein the multiple media stream modifiers receive different additional video content.

40. The system of claim 37 wherein the modification information determines the additional video content.

41. The system of claim 23 wherein the additional video content comprises a sequence of images.

42. The system of claim 23 wherein the apparatus is further coupled to a remote entity for receiving a signal and in response to determine the opportunity.

43. The system of claim 42 wherein the remote entity is a media broadcaster.

44. The system of claim 23, wherein the media modifier is adapted to modify at least one macro-block of a frame, and leaving at least one macroblock of the frame unmodified.

45. The system of claim 23, wherein the apparatus and the media stream modifier belong to a first tier of a multiple tier distribution system and one or more second tier media stream modifiers belong to a second tier of the multiple tier distribution system, wherein more than one of the multiple tiers comprises media sources that provide media streams to multiple media stream modifiers of the respective tier, wherein the multiple media stream modifiers of the respective tier differ from set top boxes; wherein a server of the second tier is configured to determine an opportunity to modify at least one media stream portion of the compressed media stream, to generate modification information representative of said determination; and to transmit the modification information to a third tier media stream modifier that belongs to a third tier of the multiple tier distribution system, wherein each component of the third tier is closer to end users to which it provides media stream than all of the components of the second tier from which it receives information, wherein each component of the second tier is closer to end users to which it provides media stream than all of the components of the first tier from which it receives information, wherein the media stream modifier that belongs to the third tier is configured to modify the modified media stream modified by the media stream modifier of the second tier.

46. The system of claim 23, wherein the media stream modifier is coupled over a first network connection to a media source that provides to the media stream modifier video and audio streams, and over a second network connection that is different than the first network connection to an additional video content provider that provides the additional media content to be inserted to the compressed media stream, wherein the apparatus is coupled over a third network connection to the media stream modifier, over a fourth network connection that is different than the third network connection to the media source, and over a fifth network connection that is different than the third and fourth network connections to the additional content provider.

* * * * *